2

United States Patent Office 3,321,502
Patented May 23, 1967

3,321,502
NICKEL PHENOLATES AND THEIR USE AS LIGHT STABILIZERS FOR POLYOLEFINS
Mary Lou Soeder, Minneapolis, Minn., assignor to Hercules Incorporated, a corporation of Delaware
No Drawing. Original application Aug. 6, 1962, Ser. No. 214,834, now Patent No. 3,282,887, dated Nov. 1, 1966. Divided and this application Sept. 28, 1965, Ser. No. 505,220
6 Claims. (Cl. 260—439)

This is a division of application Ser. No. 214,834, filed Aug. 6, 1962, now U.S. Patent No. 3,282,887.

The present invention relates to polyolefin compositions and more particularly to polyethylene and stereoregular polymers of propylene and higher α-olefins having improved stability to light.

Highly crystalline, high molecular weight polymers of ethylene, propylene, and higher α-olefins are well known and have many established uses. However, one of the deficiencies of such polymers which must be overcome to enable their use in many applications is poor stability to light.

It is disclosed in U.S. Patent 2,971,940 that bis(p-alkylphenol) sulfides in which part or all of the phenolic hydrogen atoms have been replaced by nickel (that is, compounds which comprise at most one atom of divalent nickel per molecule of bis(p-alkylphenol) sulfide) are effective light stabilizers for polypropylene. While these nickel stabilizers are used commercially and have proved to be quite valuable, they have two primary disadvantages. One disadvantage is that a polymer containing one of such stabilizers cannot be heated to a temperature higher than about 260 to 275° C. without turning dark in color. The other is that articles, eg.g., fibers, made from the so-stabilized polymer have very poor resistance to gas discoloration. By gas discoloration is meant the change in color or yellowing that is caused by fumes from gas and oil flames or industrial atmospheres containing oxides of nitrogen. Since the average household contains such fumes, rugs, draperies, and other home furnishings made from fibers of the polymer are susceptible to gas discoloration in their customary use.

Nickel phenolates of bis(p-alkylphenol) sulfoxides and sulfones which contain, at the most, one atom of nickel per molecule of bis(p-alkylphenol) sulfoxide or sulfone have also been suggested as stabilizers for polypropylene. These, too, are effective stabilizers for stereoregular polypropylene as well as stereoregular polymers of higher alpha-olefins, and they possess marked improvement over the corresponding sulfides of U.S. 2,971,940 by virtue of being less susceptible to discoloration when heated and by virtue of providing improved resistance to gas discoloration.

The present invention is based on the discovery that nickel phenolates of bis(p-alkylphenol) sulfoxides and sulfones in which the ratio of nickel to bis(p-alkylphenol) sulfoxide or sulfone molecules is two (hereinafter sometimes referred to as the 2:1 phenolate) possess a significantly greater ability, pound for pound, to stabilize stereoregular polypropylene and stereoregular polymers of higher alpha-olefins against the deleterious effects of light than do such phenolates containing at most one atom of nickel or the compounds of U.S. 2,971,940. They also provide good resistance to gas discoloration and impart good dyeability to fibers in which they are present.

The invention is particularly useful in stabilizing stereoregular polymers of monoolefins having from 3 to 6 carbon atoms, including, for instance, polypropylene, poly(butene-1), poly(pentene-1), poly(3-methylbutene-1), and poly(4-methylpentene-1). Polyethylene, even though it degrades under the influence of light by a mechanism somewhat different than the above stereoregular polymers, is also susceptible to stabilization by the invention. Although the nickel phenolates used as additives in accordance with the present invention increase the light stability of polyethylene, stereoregular polypropylene, and related stereoregular polymers quite markedly, an even further increase in light stability can be achieved by also incorporating a phenolic compound in the polymer.

The stabilizers of the present invention are nickel phenolates in which each phenolic hydrogen atom has been replaced by a different divalent nickel ion and the remaning valence of each nickel ion is satisfied by an anion. These nickel phenolates thus contain 2 atoms of nickel per bis(p-alkylphenol) sulfoxide or sulfone molecuple. Although on a laboratory scale it is possible to prepare the pure compounds, this is unnecessary to obtain products of high commercial utility. In accordance with the present invention, it has also been found that compositions comprising mixtures of the 2:1 nickel phenolates and the 1:1 nickel phenolates, i.e., phenolates which contain one atom of nickel per molecule of bis(p-alkylphenol) sulfoxide or sulfone, which mixtures contain at least 35% by weight of the 2:1 compound and contain an average of at least 1.3 nickel atoms per bis(p-alkylphenol) sulfoxide or sulfone molecule, also show demonstrable advantage over the 1:1 nickel phenolates on an equal weight basis.

The nickel phenolates of the present invention have the general formula:

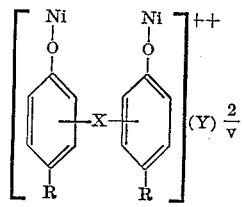

where R is an alkyl radical containing 1 to 20 carbon atoms, X is selected from the group consisting of sulfoxide and sulfonyl radicals, Y is an anion, and v is the valence of the anion Y. At least 35% by weight of such nickel phenolate is present in nickel compositions containing an average of at least 1.3 nickel atoms per bis(p-alkylphenol) sulfoxide or sulfone molecule having the general formula:

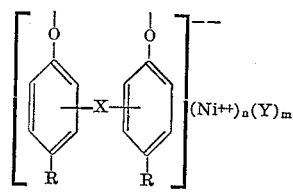

where R, X, and Y are as above, n equals a number from 1.3 to 2, and m equals 2n-2/v where v is the valence of the anion Y. The nickel phenolates of the present invention, for simplicity, are illustrated above as having ionic bonds. This, however, does not exclude the possibility of covalent bonding in certain cases.

It is to be understood that in addition to the groups shown, more aromatic or aliphatic hydrocarbon groups or hydroxyl or other oxygenated groups may be included to modify the physical characteristics, e.g., compatibility or efficiency of the light stabilizer, without departing from the basic concept of this invention.

The nickel phenolates employed in the invention can be prepared by reacting 1 mole of the full sodium phenolate of the bis(p-alkylphenol) sulfoxide or sulfone with 2 moles of a nickel halide in anhydrous medium. Alternatively, the compounds may be produced by reacting 2 moles of a nickel salt of a weak acid with 1 mole of the bis(p-alkylphenol) sulfoxide or sulfone. Nickel compositions containing an average of at least 1.3 nickel atoms per bis(p-alkylphenol) sulfoxide or sulfone molecule can be prepared by either of these methods using at least 1.3 moles of the nickel halide or nickel salt. The full sodium phenolate can be made, for example, by reacting the phenol with at least two equivalents of sodium ethoxide in anhydrous ethanol. The bis(p-alkylphenol) sulfoxides and sulfones can be made by oxidation of the corresponding sulfides, bis(p-amylphenol) sulfoxide can be made, for example, by oxidizing bis(p-amylphenol) sulfide with hydrogen peroxide in acetic acid using the technique shown by Wagner and Zook, Synthetic Organic Chemistry, New York, Wiley & Sons (1953), p. 801. Bis(p-amylphenol) sulfone can be made by oxidizing the above sulfide or sulfoxide with hydrogen peroxide in acetic acid using the same technique.

The nickel phenolates of the present invention are those of bis(p-alkylphenol) sulfoxides and sulfones in which the alkyl group contains 1 to 20 carbon atoms. Preferably, these phenolic sulfoxides and sulfones will be the o,o'-bis(p-alkylphenol sulfoxides and sulfones. Exemplary of such compounds are o,o'-bis(p-cresol) sulfoxide, o,o'-bis(p-cresol) sulfone, o,o'-bis(p-ethylphenol) sulfoxide, o,o'-bis(p-ethylphenol) sulfone, o,o'-bis(p-isopropylphenol) sulfoxide, o,o'-bis(p-isopropylphenol) sulfone, o,o'-bis(p-tert-butylphenol) sulfoxide, o,o'-bis(p-tert-butylphenol) sulfone, o,o'-bis(p-methylphenol) sulfoxide, o,o'-bis(p-menthylphenol) sulfone, o,o'-bis(p-amylphenol) sulfoxide, o,o'-bis(p-amylphenol) sulfone, o,o'-bis(p-octylphenol) sulfoxide, i.e., the o,o'-bis(p-1,1,3,3-tetramethylbutylphenol) sulfoxide, o,o'-bis(p-1,1,3,3-tetramethylbutylphenol) sulfone, o,o'-bis(p-nonylphenol) sulfoxide, o,o'-bis(p-nonylphenol) sulfone, o,o'-bis(p-cyclohexylphenol) sulfoxide, o,o'-bis(p-cyclohexylphenol) sulfone, o,o'-bis(p-dodecylphenol) sulfoxide, and o,o'-bis(p-dodecylphenol) sulfone, as well as o,m'-bis(p-amylphenol) sulfoxide, o,m'-bis(p-amylphenol) sulfone, o,m'-bis(p-octylphenol) sulfoxide, o,m'-bis(p-octylphenol) sulfone, and the like.

In the previous formulas, the permissible anion substituents are numerous and varied. Preferred anions include hydroxyl, alkoxy, acyloxy, oxide, halide, sulfate, nitrate, phosphate, thiocyanate, cyanide, p-toluenesulfonate, methanesulfonate, phosphite, aryl, and alkyl phosphonates, molybdate, and the like. Typical alkoxy radicals include methoxy, ethoxy, octyloxy, decyloxy, propoxy, butoxy, amyloxy, and dodecyloxy.

Typical nickel phenolates that can be used in accordance with the present invention include the nickel salts of o,o'-bis(p-alkylphenol) sulfoxides and sulfones wherein the p-alkyl group, salt-forming anion, and ratio of nickel atoms to bis(p-alkylphenol) sulfoxide and sulfone molecules (Ni/S) are as tabulated below:

TABLE I

| p-Alkyl Group | Salt-Forming Anion | Ni/s |
|---|---|---|
| 1,1,3,3-tetramethylbutyl | 2-ethylhexanoate | 2 |
| Do | Hydroxide | 1.3 |
| Do | Acetate | 2 |
| Do | Ethoxide | 2 |
| Do | do | 1.7 |
| Do | Laurate | 2 |
| Do | Valerate | 2 |
| Nonyl | 2-ethylhexanoate | 2 |
| Do | Acetate | 2 |
| t-Butyl | do | 2 |
| Do | 2-ethylhexanoate | 2 |
| t-Amyl | Acetate | 2 |
| Do | 2-ethylhexanoate | 2 |
| Cyclohexyl | Acetate | 2 |
| Do | 2-ethylhexanoate | 2 |
| t-Amyl | Thiocyanate | 1.6 |
| m-Methyl-p-t-amyl | Acetate | 1.8 |
| t-Amyl | Chloride | 1.4 |

Typical 2:1 nickel phenolates also include the o,m'-bis(p-alkylphenol) sulfoxides and sulfones wherein the p-alkyl group is isopropyl, butyl, amyl, cyclohexyl, octyl, and nonyl, and the salt-forming anion is propionate, isobutyrate, 2-ethyl hexanoate, and the like.

The amount of the nickel phenolate incorporated in the polymer can be varied from a very small amount up to several percent. More specifically, beneficial results are normally obtained when it is employed in an amount from about 0.01% to about 5% by weight of the polymer. The optimum amount will usually lie between about 0.1% to 2.5% by weight of the polymer, depending primarily upon the degree of stability desired and whether or not the phenolate is employed as a mixture with the 1:1 nickel phenolate.

As previously mentioned, one of the preferred but optional embodiments of the invention comprises incorporating into the polymer a phenolic compound in addition to the nickel phenolate. By this embodiment, the ability of the nickel phenolate to stabilize the polymer is synergistically enhanced to an even greater degree. The phenolic compound, when used, preferably comprises from 0.01% to 5% by weight of the polymer. Suitable phenolic compounds that are useful in this embodiment include polyalkylphenols, alkylidene-bis(alkylphenol)s, 2 (2' - hydroxyphenol) - 2,4,4 - polyalkylchromans, 4(2'-hydroxyphenyl)-2,2,4-polyalkylchromans, thiobisphenols, and adducts of an alkylphenol and a cyclic terpene.

The stabilizers used in accordance with this invention may be admixed with the polyolefin by any of the usual procedures for incorporating a stabilizer in a solid material. A simple method is to dissolve the stabilizers in a low boiling solvent such as benzene or hexane and, after thoroughly mixing the solution with the polymer in flake or other such form, evaporating the solvent; or they may be incorporated by various means of mechanical mixing, etc.

In addition to the nickel phenolate and the phenolic compound, there may also be present compounds capable of decomposing peroxides, e.g., dilauryl thiodipropionate, dialkyldisulfides, zinc dialkyldithiocarbamates, zinc dialkyldithiophosphates, and the like, which help to improve the heat stability of the polymer. The stabilizers may also be used in combination with other stabilizers such as ultraviolet light absorbers, antacids such as calcium soaps, organic phosphites, or other antioxidants. Other materials may also be incorporated in the polymer, as, for example, pigments, dyes, fillers, antistatic agents etc.

The following examples illustrate the preparation of some nickel derivatives of the bis(p-alkylphenol) sulfoxides and sulfones of this invention and the degree of stabilization that is obtained when the derivatives are incorporated in polyolefins. The term "RSV" as used herein denotes reduced specific viscosity, which is the specific viscosity divided by concentration of a 0.1% weight/volume solution of polymer in decahydronaphthalene at 135° C. All parts and percentages are by weight and the percentages are based on the weight of polymer unless otherwise stated. The Ni/S ratio as used in the examples denotes the average ratio of nickel atoms to bis(p-alkylphenol) sulfoxide or sulfones molecules, as the case may be.

*Example 1*

0.23 part of sodium were dissolved in 20 parts anhydrous ethyl alcohol in a centrifuge bottle. 1.19 parts of o,o'-bis(p-1,1,3,3-tetramethylbutylphenol) sulfone were added to the ethyl alcohol solution and dissolved with gentle warming. A solution of 0.65 part anhydrous nickel chloride in 15 parts anhydrous ethanol (prepared in advance and allowed to stand for three weeks in a capped bottle prior to use) was added. The bottle was then capped to prevent undue exposure to moist air, and the contents centrifuged to separate the sodium chloride. After centrifuging, the centrifugate was freed of solvents by distillation in vacuo at 20° C. The residue (1.73 parts)

of green solid contained 17.5% nickel (by direct ashing), 52.9% carbon, and 7.2% hydrogen. This analysis indicated that approximately two nickel atoms were present in the molecule, the anions on the nickel being ethoxy.

*Example 2*

A mixture of 3.45 parts of nickel 2-ethylhexanoate and 2.37 parts of o,o'-bis(p-1,1,3,3-tetramethylbutylphenol) sulfone was heated for two hours at 140° C. and 1 mm. pressure, then at 160° C. for thirty minutes, and finally for thirty minutes at 180° C., the reaction being carried out so that the by-product 2-ethylhexanoic acid was distilled off as formed. The residue (4.31 parts of green resin) contained 14.1% nickel (determined as nickel glyoxime), 57.0% carbon, and 8.0% hydrogen. The analysis indicated the presence of two nickel atoms per molecule, the anions on the nickel atoms being 2-ethylhexanoate.

*Example 3*

Example 2 was repeated except that 2.30 parts of o,o'-bis(p-1,1,3,3-tetramethylbutylphenol) sulfoxide was used in place of the sulfone. The product (4.29 parts of green resin) contained 13.0% nickel.

*Example 4*

The procedure of Example 1 was repeated using 2.37 parts of o,o'-bis(p-1,1,3,3-tetramethylbutylphenol) sulfone dissolved in a solution of 0.23 part sodium in 40 ml. anhydrous ethanol, and a solution of 1.30 parts anhydrous nickel chloride in 30 parts anhydrous ethanol. When precipitation of the sodium chloride was complete, a solution of 0.82 part sodium acetate in 50 parts anhydrous ethanol was added. After centrifugation to separate the sodium chloride, the solvent was removed from the centrifugate by distillation in vacuo at 20° C. The residue (3.61 parts of green crystalline solid) contained 15.8% nickel. In this product the anion on each nickel atom was acetate.

*Example 5*

A 40% solution of o,o'-bis(p-1,1,3,3-tetramethylbutylphenol) sulfone in xylene was heated with a quantity of nickel acetate tetrahydrate equivalent to the number of phenolic OH groups in the bisphenol molecule, at boiling, the water and acetic acid being distilled off as formed, some xylene distilling in the process. The reaction mixture was then filtered to remove insoluble compounds and the filtrate evaporated to remove all the xylene. The residue, a green crystalline solid, contained 10.1% nickel. This product contained approximately one nickel atom per molecule, possibly with a molecule of acetic acid coordinated to the nickel atom.

This product, the full nickel phenolate of o,o'-bis(p-1,1,3,3-tetramethylbutylphenol) sulfone containing a Ni/S ratio of 1:1 (or alternatively the one prepared by reacting equal moles of the sodium phenolate of the corresponding sulfone with nickel chloride under anhydrous conditions according to the procedure of Example 1) was dissolved in boiling hexane. Ninety-five percent ethanol was then added and most of the hexane removed by distillation. The green crystals which formed upon cooling the residue contained 13.7% nickel. A nickel salt containing 1.3 nickel atoms per sulfone molecule with hydroxyl groups satisfying the free nickel valences would contain 13.6% nickel.

*Examples 6–9*

In these examples different portions of stereoregular polypropylene having a birefringent melting point of about 167° C. and a reduced specific viscosity of 4.0 were thoroughly blended with 0.5% of the reaction product of 2 moles of nonylphenol and 1 mole of acetone, the reaction product comprising a mixture of isopropylidene-bis(nonylphenol) and 2(2'-hydroxyphenyl)2,4,4-trimethyl-5',6-dinonylchroman, hereinafter referred to as NP–A–RP and specified amounts of a nickel phenolate of an o,o'-bis(p-1,1,3,3-tetramethylbutylphenol) sulfone containing varying amounts of nickel per bisphenol sulfone molecule. Each blend was extruded into molding powder at 210° C., and the molding product was then pressed into sheets 25 mils thick. Strips cut from these sheets and 0.5 inch wide were exposed to outdoor weathering in southern Florida at a 45° angle facing south. During the exposure the development of brittleness in each strip was observed by periodically folding to an angle of 180° and noting any change taking place on the fold line. The following rating schedule was used to evaluate the degree of brittleness from outdoor exposure:

1 = Unchanged from original condition
2 = Slight surface crazing on fold
3 = Shallow cracks on fold
4 = Breaks in cheesy manner, but pieces hang together, considered failure
5 = Brittle break failure Compositions and exposure data are as follows:

TABLE II

| Example | Stabilizer | Ni/S Ratio | Percent Nickel Stabilizer by Weight of Polymer | Embrittlement Time Florida Exposure Rating | |
|---|---|---|---|---|---|
| | | | | 20,000 Langleys | 30,000 Langleys |
| 6 | Nickel phenol phenolate of o,o'-bis(p-1,1,3,3-tetramethylbutylphenol) sulfone. | 1:2 | 0.50 | 5 | 5 |
| 7 | Full nickel phenolate of o,o'-bis(p-1,1,3,3-tetramethylbutylphenol) sulfone. | 1:1 | 0.27 | 3 | 5 |
| 8 | Nickel phenolate of o,o'-bis(p-1,1,3,3-tetramethylbutylphenol) sulfone wherein anion Y is acetate. | 2:1 | 0.15 | 2 | 3–4 |
| 9 | Nickel phenolate of o,o'-bis(p-1,1,3,3-tetramethylbutylphenol) sulfone wherein anion Y is hydroxide. | 1.3:1 | 0.70 | 2 | 2 |
| Control | No nickel phenolate but NP–A–RP | | | 5 | |
| Do | No nickel phenolate and no NP–A–RP | | | 5 | |

*Example 10*

The procedure of Examples 6–9 was repeated using 0.5% of the product of Example 1 (Ni/S ratio of 2) and 0.5% NP–A–RP. Exposure in Florida gave ratings of 2, 3, and 3 at 20,000, 30,000, and 40,000 Langleys, respectively.

*Example 11*

Example 10 was repeated using instead of the product of Example 1, 0.5% of the product of Example 3 (Ni/S ratio of about 2:1). Exposure in Florida gave a rating of 3 at 40,000 Langleys.

Examples 12–13

The procedure of Examples 6–9 was repeated using 0.5% of the nickel phenolates of o,o'-bis(p-1,1,3,3-tetramethylbutylphenol) sulfone containing various anions and varying amounts of nickel per bisphenol sulfone molecule and 0.5% NP–A–RP, the phenolate of Example 13 being the product of Example 5. Compositions and exposure data are as follows:

TABLE III

| Example | Anion of Ni Stabilizer | | Ni/S Ratio | Embrittlement Time Florida Exposure Rating | | |
|---|---|---|---|---|---|---|
| | Anion | Percent Ni | | 20,000 Langleys | 30,000 Langleys | 40,000 Langleys |
| 12 | OC$_2$H$_5$ | 15.4 | 1.7 | 2 | 3 | 3 |
| 13 | OH | 13.7 | 1.3 | 2 | 3 | 3 |

Example 14

Polyethylene having a density of 0.96 was blended with 0.5% of the nickel phenolate of Example 8, the blend extruded into molding powder, pressed into sheets, and cut into strips according to the procedure of Examples 6–9. In this case the exposure rating was determined by fastening the strips onto pieces of white cardboard and placing in a fadeometer. At 24-hour intervals, the strips were tested for development of brittleness by bending. The time noted for each strip to become brittle to the extent that it breaks when bent double was noted as the embrittlement time. At the end of fifty-five days in the fadeometer no breakage had occurred whereas the control containing no nickel stabilizer failed in seven days.

From the foregoing it is apparent that polyethylene and stereoregular polymers of alpha-olefins having 3 or more carbons may be modified in accordance with this invention to impart improved light stability to the polymers as well as to any shaped object made from these polymers.

Articles, e.g., fibers made from polyolefins containing the nickel phenolates of the present invention, also exhibit improved dyeability. In general, useful dyes fall into five main classes, or types; namely, disperse dyes, azoic dyes, vat dyes, vat ester dyes, and sulfur dyes. These are all well-known dye types, and a substantial listing of individual dyes of each type appears in the Technical Manual of the American Association of Textile Chemists and Colorists (AATCC), volume XXXVI, (1960). Colour Index, Second Edition, 1956, edited jointly by the Society of Dyers and Colourists and the American Association of Textile Chemists and Colorists compiles a vast amount of information on many of the useful dyestuffs or prototypes of these at the time of publication relative to commercial names, manufacturers, chemical composition and how made, identification by C.I. numbers and names, and the like. Dyes of the disperse type and of the azoic type are preferred since they fully penetrate the fibers. Vat dyes, vat ester dyes, and sulfur dyes are less preferred since these dyes penetrate the fibers only superficially to produce "ring dyeings." In order to demonstrate the improved dyeability achieved with the compositions of the present invention, fabric knit from 210 denier 35 filament stereoregular polypropylene continuous yarn melt spun from the composition of Example 10 was dyed with the following dyestuffs, namely: Celliton Fast Yellow 4RL (General Dyestuffs); Polydye Blue GSFR (Interchemical); Sandoz WRN 4245 (experimental dyestuff—Sandoz); NAC BC 31674 (experimental dyestuff—National Aniline); Sandoz WRN 4214 (experimental dyestuff—Sandoz); Resolin Blue RRL (Bayer-Verona); C.I. 67415 Mordant Blue 27; C.I. Azoic Coupling Component 12 (C.I. 37550–Napthol AS–ITR) with C.I. Azoic Diazo Component 42 (C.I. 37150—Red Base ITR); and C.I. Azoic Coupling Component 12 with C.I. Azoic Diazo Component 20 (C.I. 31175—Blue Base BB), using known methods for dyeing hydrophobic artificial fibers. The dyed fabrics exhibited good dyeability, excellent washfastness, good resistance to dry-cleaning solvents, and good lightfastness when tested in accordance with the methods 85–1960, 61–1957–IIIA, and 16A–1960 described in the Technical Manual of the American Association of Textile Chemists and Colorists, volume XXXVI, 1960, Howes Publishing Co., Inc., N.Y. By contrast, fibers spun from polymers containing no nickel phenolate exhibited poor dyeability, fair-good washfastness, very poor resistance to dry-cleaning solvents, and poor lightfastness.

What I claim and desire to protect by Letters Patent is:

1. The nickel phenolate of a compound selected from the group consisting of bis(p-alkylphenol) sulfoxides and bis(p-alkylphenol) sulfones, said nickel phenolate having the formula:

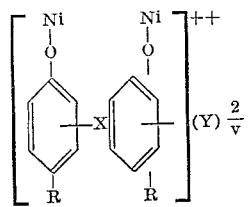

where R is an alkyl radical containing 1 to 20 carbon atoms, X is selected from the group consisting of sulfoxide and sulfonyl radicals, Y is an anion, and $v$ is the valence of the anion Y.

2. The compound of claim 1 wherein the anion Y is selected from the group consisting of hydroxyl, alkoxy, acyloxy, oxide, halide, nitrate, phosphate, sulfate, cyanide, and thiocyanate.

3. The compound of claim 1 wherein the nickel phenolate is o,o'-bis(p-1,1,3,3-tetramethylbutylphenol) sulfone and the anion Y is ethoxide.

4. The compound of claim 1 wherein the nickel phenolate is o,o'-bis(p-1,1,3,3-tetramethylbutylphenol) sulfone and the anion Y is 2-ethylhexanoate.

5. The compound of claim 1 wherein the nickel phenolate is o,o'-bis(p-1,1,3,3-tetramethylbutylphenol) sulfoxide and the anion Y is 2-ethylhexanoate.

6. The compound of claim 1 wherein the nickel phenolate is o,o'-bis(p-1,1,3,3-tetramethylbutylphenol) sulfone and the anion Y is acetate.

References Cited by the Examiner

UNITED STATES PATENTS

| 2,493,986 | 1/1950 | McNab et al. | 260—439 |
| 3,044,960 | 7/1962 | Morway et al. | 252—35 |
| 3,072,601 | 1/1963 | Breslow | 260—439 |

TOBIAS E. LEVOW, *Primary Examiner.*

A. P. DEMERS, *Assistant Examiner.*